United States Patent
González

(10) Patent No.: US 10,945,501 B2
(45) Date of Patent: Mar. 16, 2021

(54) STRETCHABLE REUSABLE BAG

(71) Applicant: Alfonso Aguayo González, Santiago (CL)

(72) Inventor: Alfonso Aguayo González, Santiago (CL)

(*) Notice: Subject to any disclaimer, the term of this patent is extended or adjusted under 35 U.S.C. 154(b) by 0 days.

(21) Appl. No.: 16/814,442

(22) Filed: Mar. 10, 2020

(65) Prior Publication Data

US 2020/0375326 A1    Dec. 3, 2020

Related U.S. Application Data

(60) Provisional application No. 62/854,634, filed on May 30, 2019.

(51) Int. Cl.
| | |
|---|---|
| *A45C 3/00* | (2006.01) |
| *A45C 3/04* | (2006.01) |
| *B65D 30/00* | (2006.01) |
| *B65D 33/10* | (2006.01) |

(52) U.S. Cl.
CPC ............. *A45C 3/001* (2013.01); *A45C 3/045* (2013.01); *B65D 29/00* (2013.01); *B65D 33/10* (2013.01); *A45C 2003/002* (2013.01)

(58) Field of Classification Search
CPC ......... A45C 3/001; A45C 3/002; A45C 3/045; A45C 2003/002; B65D 29/00; B65D 33/10
USPC ........................................................ 383/117
See application file for complete search history.

(56) References Cited

U.S. PATENT DOCUMENTS

| | | | |
|---|---|---|---|
| 2,130,948 A | 9/1938 | Carothers | |
| 3,023,192 A | 2/1962 | Shivers, Jr. | |
| 3,322,176 A * | 5/1967 | Geller | B65D 29/04 383/6 |
| 4,973,647 A | 11/1990 | Bretches et al. | |
| 5,000,899 A | 3/1991 | Dreibelbis et al. | |
| 5,009,516 A * | 4/1991 | Geeck | A45C 3/04 206/37.1 |
| 5,050,999 A | 9/1991 | Van Loon | |
| 5,456,062 A * | 10/1995 | Wechsler | B65D 33/28 229/87.19 |
| 10,244,837 B2 * | 4/2019 | Butler | A45C 9/00 |
| 2005/0089249 A1* | 4/2005 | Negron | B65D 29/00 383/33 |

(Continued)

FOREIGN PATENT DOCUMENTS

| | | | | |
|---|---|---|---|---|
| FR | 829727 A * | 7/1938 | ............. | A45C 3/045 |
| JP | 2010005352 A * | 1/2010 | ............... | A45C 3/04 |

*Primary Examiner* — Jes F Pascua
(74) *Attorney, Agent, or Firm* — Mariana I. Vernieri

(57) ABSTRACT

A Stretchable Reusable bag such as for shopping or groceries that is small enough to be kept inside a pocket when in its Compacted Mode and easily and quickly decompressed into an Empty Mode and then expandable to a large In-Use Mode in which it is capable of adapting to the shape and volume of Regular-Sized Items until acquiring a total volume of 500 times the volume of the bag in its Compacted Mode through Smooth Transitions, is achieved by sewing one or more handles to an elastic waistband attached to a rectangular or squared Main Body primarily made of a Nylon-elastane fiber material, preferably in its 85% nylon-15% elastane configuration and its micro-fishnet mesh variant. A method is disclosed for the formation of these bags out of the repurposing of a micro-fishnet pantyhose.

6 Claims, 3 Drawing Sheets

(56) References Cited

U.S. PATENT DOCUMENTS

2006/0032515 A1  2/2006  Thall
2012/0155789 A1  6/2012  Riso

* cited by examiner

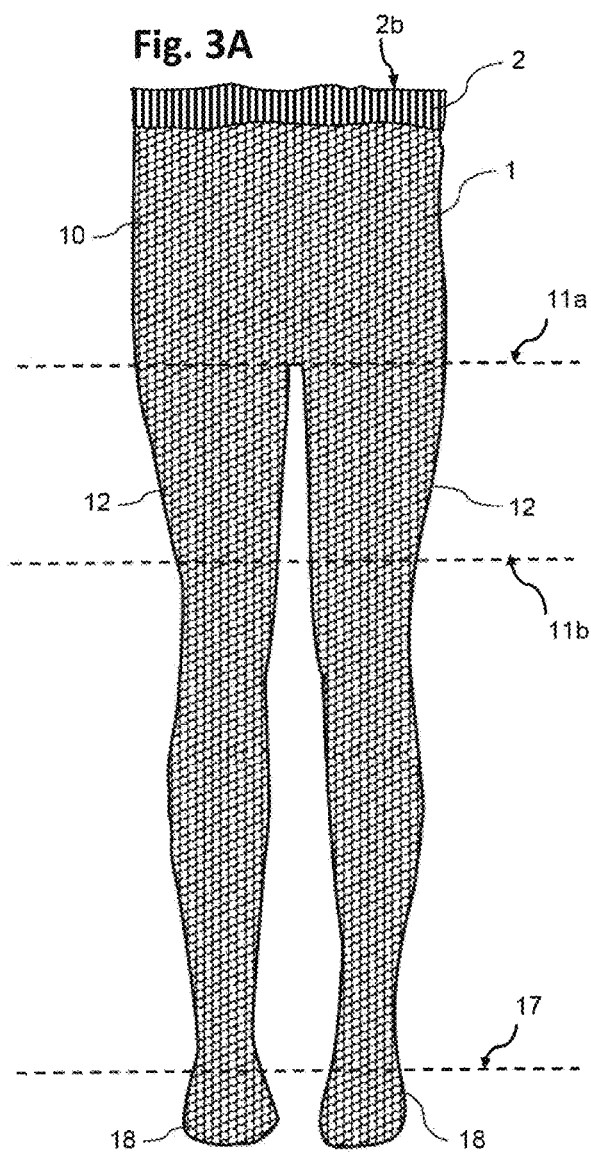
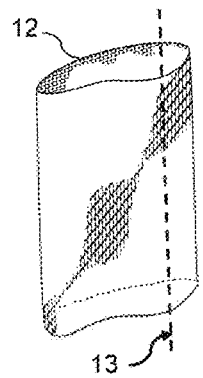
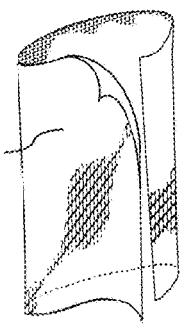
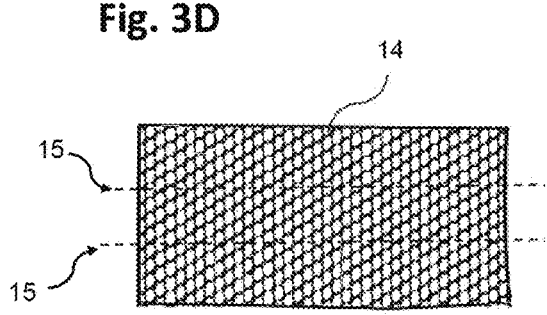
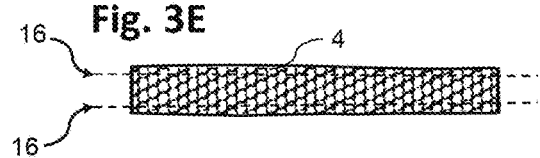
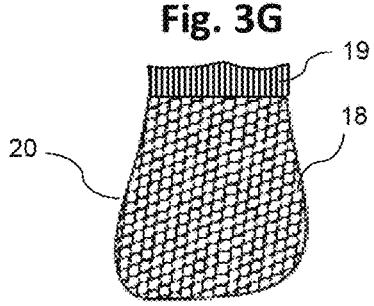
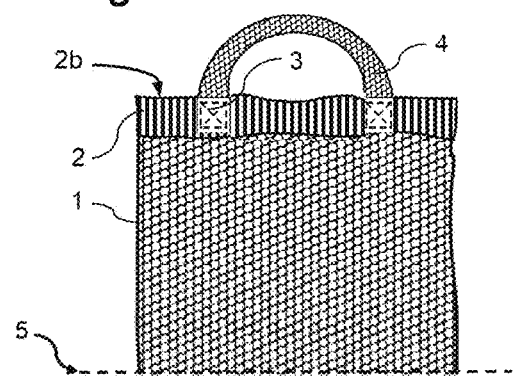

STRETCHABLE REUSABLE BAG

TECHNICAL FIELD

This invention relates generally to the field of bag construction and, more particularly, to the construction of elastic mesh Stretchable Reusable shopping and carrying bags.

BACKGROUND OF THE INVENTION

The widespread use of disposable plastic bags for shopping and transportation of goods in general, and for its use in supermarkets in particular, is being restricted worldwide due to the effort by governments and environmental organizations to control and revert the irreversible negative impact they are causing to our planet.

It is no secret that disposable plastic bags are an important source of waste and pollution. Not being biodegradable, plastic bags take around 400 years to decompose. The insipient governmental efforts for recycling plastic bags to mitigate this impact have been so far extremely ineffective. Even though the recycling symbol (consisting of three-chasing-arrows in the shape of a triangle having round vertices) can be found in many plastic bags in the United States, its use is often no more than a marketing gimmick. There are no nation-wide regulations on how this symbol is used, and every city and county in America has different regulations about what can be recycled. Despite what the customers may think, many plastic bags that are collected by recycling companies cannot actually be recycled and only about 10% of these bags are effectively recycled. As for the remaining 90%, most of these bags end up in landfills where they stay for hundreds of years. We are talking about thousands of millions of plastic bags that are being accumulated every day. This unprecedented accumulation is deleterious for the environment and has terrible consequences. It is known that the accumulation of large quantities of plastic bags blocks local drainage systems and they may cause floods. Plastic bags also pose health risks to human populations over the years as they filter toxins into water supplies.

Plastic bags have greatly contributed to a large amount of plastic debris found in the North Pacific Ocean. This is known as the Great Pacific Garbage Patch. It is estimated to be twice the size of Hawaii and could even be as large as the entire continental United States. Kamilo Beach in Hawaii is often buried in several feet of plastic bags that bathe from the sea.

The impact of plastic bags on animal life is also troublesome. Midway Atoll in the North Pacific Ocean is home to the largest albatross colony on Earth. These birds fly over the sea to look for food for the offspring. Unfortunately, thousands of these precious birds have been found dead because they had ingested large quantities of fragments of plastic bags. All the plastic found in these birds is taken to the island by adult birds and fed to young birds. It is estimated that four tons of plastic accumulate here daily.

All of these factors make plastic bags one of most common types of garbage in the world, and, consequently, one of the biggest ecological challenges yet to be solved.

The growing awareness about these serious issues inspires an increasing number of governmental and institutional initiatives to revert this situation, including limitations and, in some cities, the absolute prohibition of the use of disposable plastic bags in shops and supermarkets. As a consequence of this worldwide phenomenon, the gradual eradication of disposable plastic bags gives birth to the pressing need of providing reusable alternatives to transport our purchases.

This may be great for the environment, but from the standpoint of the customer, the ease and practicality with which they were used to shop and carry home their groceries, produce and other items is being taken away from them, together with the plastic bags. In the increasing number of cities where plastic bags are prohibited, customers often find themselves in an uncomfortable situation, in which, every time they go to a commercial store having forgotten to carry their own reusable bag(s) with them, they are forced to choose one out of these four (suboptimal) alternatives:

(a) leaving everything and going home without buying any products;
 (b) going home and returning to the shop or supermarket later with a bag;
 (c) buying a bag or bags to take home the products (making the final purchase more expensive); or
 (d) carrying everything their hands, when possible, risking that items may fall at any time (for example while crossing the street or trying to get the keys out)

The main cause behind the recurring occurrence of this uncomfortable situation resides in how bulky and impractical the current options of reusable bags available to the public are. The materials with which the reusable bags are made often include bioplastic, raffia, cardboard, potato starch, and different kinds of natural or synthetic fabrics, and all of them are of a relatively fixed size, appropriate for the transportation of a reasonable volume of groceries or other items, which make them impractical to carry. A bag which is really small while empty, so that it can fit in a pocket or purse, and then acquire a larger size when it use to adapt to the volume of the items to be carried, would largely solve this problem.

Some attempts have been made to create reusable bags that can be folded or somehow reduced in size for the convenience of their transportation However, the process in which this size-reduction takes place is cumbersome, requiring time and dedication from the user (time and dedication they would rather not spend folding bags if they had a better alternative). Moreover, even after the folding efforts have been completed, the final size of the existing reusable bags, is still too big to fit, for example, inside of a pocket or wallet, especially if carrying more than one bag at the same time.

On the other hand, there is still one more problem that the current reusable bags fail to solve. The tissues or materials they are usually made of can be contaminated with bacteria such as Salmonella or *E. coli* from food or other contaminated objects. They are, therefore, a breeding ground for foodborne bacteria and represent a health risk. According to a study about the cross-contamination potential of food products by reusable shopping bags, performed by experts from the University of Arizona and the University of Loma Linda, Calif., the bags are contaminated mainly by coliform bacteria, including *E. coli,* in sufficient quantities to cause health problems. Therefore, they constitute a good breeding ground for bacteria to grow. Even a small number of bacteria transferred from a contaminated food to the bag can start to reproduce and multiply, especially if the bags are stored in humid, warm conditions, such as under the sink. These germs, in turn, can contaminate other products that come into contact within the bag. It should be kept in mind that if the bag is reused days or a week later, the bacteria may have reached harmful levels and can be transferred to new foods bought in the next purchase. One of the main problems detected in the use of this type of bags is, therefore, that of cross contamination, which occurs when meats, products and precooked foods are placed in dirty bags.

For these reasons, we believe that providing an environmentally-conscious reusable bag that is lightweight and, when empty, small enough to keep it in the pocket of the pants and forgetting that it is there until needed, while when in use it is big enough, and resistant enough, as to carry a couple of drinks containers or several small products, being the transformation between the small Compacted Mode and the large In-Use Mode smooth, quick and convenient, constitutes the solution to, a long felt unresolved need and advances the field. Even more so, if this bag is, in addition, extremely easy to clean, dry and store, making it safe from bacteria contamination when compared to traditional reusable bags.

SUMMARY OF THE INVENTION

The main object of the present invention is to provide a new and improved Stretchable Reusable bag and a method of forming the same. A bag created in accordance with the present invention possesses ductile characteristics that allows it to, despite its original small size, quickly expand to transport Regular-Sized Items without deformation or breaking. Therefore, it can be reused on repeated occasions. When empty, it can be compacted and stored in a small space of the pocket of the clothes, without being noticed. Thanks to its ductility, the bag adapts to the shape and size of the items to be transported, providing comfortable and reliable support for them. The products are entered through the bag-opening, and when this happens, the bag expands according to the size and weight of the product. After its use, the bag returns to its original state in a few seconds, as soon as the items are removed from it, thanks to the extraordinary elasticity of its main material.

Furthermore, a bag created in accordance with the present invention offers additional advantages when compared to the prior art, these advantages including but not limited to: (a) requiring little space for storage, (b) being very fast and easy to store, mainly in a pocket, wallet or purses, (c) being useful for the transportation of products of small and medium size up to 5 Kg each, and up to 25 kg total, (d) being highly stretchable and able to multiply by 500 its compacted volume, (e) being lightweight, weighing less than 30 g when empty (f) being durable and susceptible of being reused daily for months before needing a replacement, (g) being washable in cold water in a washing machine, (h) being inexpensive when compared to other durable materials, and (i) being easy to make through simple steps and with the use of widely available and affordable raw materials.

A lightweight Stretchable Reusable bag in accordance with the present invention, is achieved by combining some or all of the following aspects:
(a) The main material used for these bags is a nylon-elastane based elastic mesh, preferably in its 85% nylon/15% elastane configuration and its micro-fishnet mesh variant.
(b) The Main Body of the bags mainly consists of a rectangular or square-shaped section substantially made of this nylon-elastane material.
(c) A "Waistband", made of elastic material, is attached to the upper pad of the main body.
(d) One or more Handles made preferably of the same material or alternatively from other materials such as nylon, leather or fabric, are attached to said Waistband.
(e) The Base of the Main Body is reinforced with cotton and polyester thread seams.

A method for obtaining these bags out of the repurposing of a pantyhose is also disclosed, comprising the steps of:
(1) Cutting out the leg section from a pantyhose primarily made of a micro-fishnet mesh nylon-elastin based material and leaving the "panty" section unharmed.
(2) Closing the lower part of the panty section obtained in step 1 with an overlock machine.
(3) Applying four pleats to the Waistband.
(4) Creating 2 handles for the bag out of the excess material extracted from the removed leg section of the pantyhose, by cutting 2 pieces of approximately 15 centimeters of length (6 inches), folding them lengthwise three times and then closing them with an overlock machine (so they do not open).
(5) Sewing the handles obtained in step 4 to the pleats of step 3.

BRIEF DESCRIPTION OF THE DRAWINGS

FIGS. 3A to 3G illustrate an embodiment of a method for forming a Stretchable Reusable bag in accordance with the present invention

DETAILED DESCRIPTION AND BEST MODE OF IMPLEMENTATION

Figure 1:
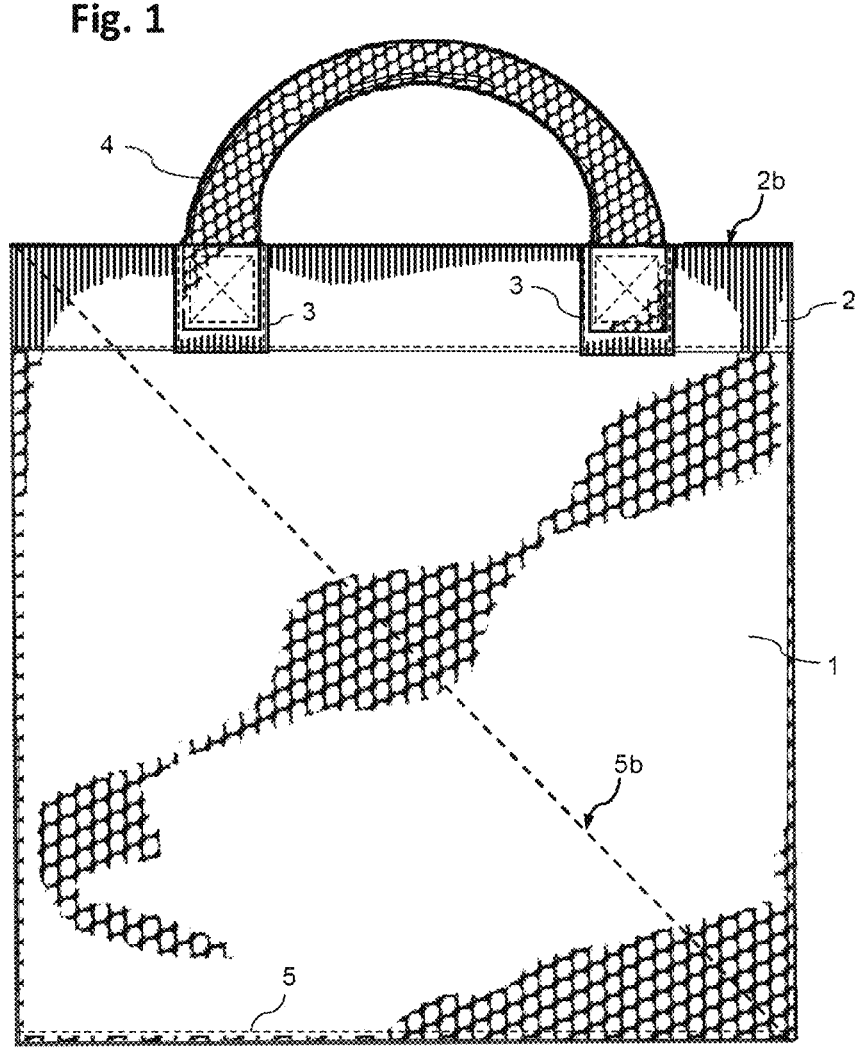
FIG. 1 is a front view of an embodiment of a Stretchable Reusable bag in accordance with the present invention.

Disclosed is a Stretchable Reusable bag such as for groceries or shopping, attained in a cost-efficient manner thanks to the incorporation of a nylon-elastane based elastic mesh As used in this specification and the appended claims, the terms "Reusability" and "Reusable" refer to the durability of the bag being such, that the bag can be used for its Purposed Use up to at least sixty consecutive times, without being destroyed, deformed or damaged to the point of losing its utility "Purposed Use" as understood i n this specification and the appended claims means that:
a) The bag is used for the functions of:
  manually placing only Regular-Sized Items in and out of it
  when loading the bag, doing it with reasonable care to achieve the expansion without tearing the fabric;
  when empty, manually compressing it to its Compacted Mode if desired;
  storing it and transporting it in either Empty Mode or Compacted Mode;
  manually decompressing it when needed;
  when in-rise, carrying the bag by its handles, cradling it, letting it stand over a flat surface or hanging it from the handles for no more than 3 hours a day; and
  washing it in cold water by machine or by hand once a week, and letting it dry naturally
b) these "Regular-Sized Items", as understood in this specification and the appended claims, are solid objects having a volume ranging from 1 $cm^3$ to 3000 $cm^3$, with no linear dimensions surpassing the measure of 1.4 times the length of the diagonal of the main body of the bag, and weighing no more than 5 kg each;

c) the total weight of the bag after the addition of these items does not surpass the maximum total weight of 10 Kg; and d) the total volume of the bag after the addition of these items does not surpass the maximum In-Use mode total volume calculated as the surface area of the Main. Body of the bag in its Empty Mode times the diagonal of the Main Body of the bag in its Empty Mode times 5.

The Purposed Use of this bag does not contemplate exposing it to extreme temperatures, hostile conditions, or any efforts other than the ones hereabove mentioned. It may resist harder conditions and still maintain its utility, but it has not been tested for other uses and therefore no reusability is guaranteed outside of the described conditions.

As used in this specification and the appended claims, the terms "Stretchability" and "Stretchable" refer to the ability of the bag to achieve four kinds of Smooth Transitions between Bag-Modes, being said Bag-Modes the following:

(a) Empty Mode: The bag adopts this mode when the bag is not in use and not compacted. When in this mode, the bag is basically planar, lightweight and of a size adequate for entering Regular Sized Items through its opening. In the preferred embodiment, this size is approximately 20 cm×20 cm.

(b) Compacted Mode: For its ease of transportation when not is use the bag may adopt this mode h being compacted to a smaller size, adequate for storing in a wallet, pocket or purse. In the preferred embodiment, this size is approximately 120 cm$^3$. The minimum Compacted Mode volume is the minimum volume to which the bag is able to be compressed through Smooth Transitions as described below.

(c) In-Use Mode: When items are inserted inside of the bag, it has the capability to adopt this mode by expanding to a size of up to three times the length of the same bag in its empty mode and twice its width. In the preferred embodiment, this size is approximately 60,000 cm3. This means that the proportion between the minimum Compacted Mode volume and the maximum In-Use volume is of at least 1 to 500.

The four kinds of transitions between Bag-Modes that need to be "Smooth Transitions" to comply with the requirements of this specification are the following: Empty Mode to Compacted Mode, Empty Mode to In-Use Mode, Compacted Mode to Empty Mode and In-Use Mode to Empty Mode. Transitions between compacted mode and In-Use Mode will usually need to go through the Empty Mode as an intermediate step, and therefore are considered as sequential transitions each of which should be a "Smooth Transition" in order to satisfy the conditions set, out by this specification. A bag in accordance with the present invention is capable of repeatedly achieving these four kinds of Smooth Transitions without being destroyed, therefore complying with the Reusability definition detailed above, as long as it is given only Reasonable Use.

When using the bag for its Reasonable Use as above described, transitions between Bag-Modes are considered to be "Smooth Transitions" in the context of this specification and the appended claims, if they comply with the following requirements:

(a) Empty Mode to Compacted Mode: Compression of the bag into the Compacted Mode is considered as a "Smooth Transition" if it can be achieved in less than 8 seconds. It may be accomplished through a variety of methods including folding it, rolling it and shaping it into a ball. In some embodiments, additional pouches properly sized for maintaining the bag into its Compacted Mode are provided, and the 8 seconds should be enough to not only compact the bag but also to insert it into the pouch.

(b) Empty Mode to In-Use Mode: The storing of Regular-Sized items inside the bag is considered as a "Smooth Transition" if it can be achieved in less than 6 seconds per item. For this, the elasticity of the bag should be such that it, does not make the storing process difficult by demanding the exertion of pressure in order to expand the bag. Also, a pause of at least one second between items is contemplated, and the transition will still be considered "Smooth" even if longer pauses between items are taken, because only the actual storing time of each item is considered.

(c) Compacted Mode to Empty Mode: Decompressing the bag into its Empty Mode so it is ready to store the products in it is considered as a "Smooth Transition" if it can be achieved in less than 4 seconds. In those embodiments in which additional pouches properly sized for maintaining the bag into its Compacted Mode are provided, 4 additional seconds should be added to this time in order to remove the bag from the pouch, and the transition will still he considered "Smooth" if it takes up to 8 seconds total to remove the bag from the pouch and decompress it.

(d) In-Use Mode to Empty Mode: Removing Regular-Sized items from the bag and restoring it to its Empty Mode is considered as a "Smooth Transition" if it can be achieved in less than 4 seconds per item.

Some general aspects of the present invention have been summarized so far in the first part of this this detailed description and in the previous sections of this disclosure. Hereinafter, a detailed description of the invention as illustrated in the drawings will be provided. While some aspects of the invention will be described in connection with these drawings, it is to be understood that the disclosed embodiments are merely illustrative of the invention, which may be embodied in various forms. The specific materials, methods, structures and functional details disclosed herein are not to be interpreted as limiting. Instead, the intended function of this disclosure is to exemplify some of the ways including the presently preferred ways—in which the invention, as defined by the claims, can be enabled for a Person of Ordinary Skill in the Art. Therefore, the intent of the present disclosure is to cover all variations encompassed within the spirit and scope of the invention as defined by the appended claims, and any reasonable equivalents thereof.

Referring to the drawings in more detail, FIG. 1 illustrates an embodiment of a Stretchable Reusable bag in accordance with the present invention. The figure is a front view showing the front side of the bag, but the back side of the bag is substantially identical to it. The bag comprises a Main Body 1, made of a nylon-elastane based elastic mesh. In the preferred embodiment, the kind of mesh used is a micro-mesh (or micro-fishnet) with a composition of nylon 85% and elastane (Spandex) 15%, however, other compositions are possible as long as the Reusability and Stretchability conditions as defined by this specification are maintained. The micro-fishnet mesh has been chosen because its mesh size is ideal for a shopping bag since it avoids the falling of small objects through the mesh openings, but other kinds of meshes such as "medium mesh" or "large mesh" may also be used in some embodiments and still maintain utility. In the preferred embodiment, the Main Body 1 has a generally squared shape of size of approximately 20 cm×20 cm Rectangular shapes and other shapes are also possible, and the sizes may vary as long as the conditions of the Bag-Modes described above in this specification as well as the conditions of Reusability, and Stretchability including Smooth Transitions are maintained. An elastic waistband 2 is attached to the Main Body 1. This Waistband in the preferred embodiment comes already attached to the Main Body's material, since this material is obtained from a commercially available Pantyhose, for example Zhongjiao Net Pants, and the same Waistband of the Pantyhose will act as the Waistband of the bag. However, in cases where no Waistband is pre-attached to the main body one can be easily attached to it, for example by sewing it, gluing it or otherwise fastening it in such a way that the Reusability of the bag is maintained. The upper side of the waistband defines the bag-opening 2b which is used for introducing and removing Regular-Sized Items through it. The waistband can be made of any kind of elastic material as long as it does not preclude the utility of the invention, and, in some embodiments, it may include one or more zippers, "velcro" straps, buttons or other fastening means, ornaments and additional design features. The figure also illustrates two pleats 3 applied to the Waistband. Another two pleats like these are equivalently included in the back side of the bag. These pleats are optional features included in this embodiment to reduce the size of the bag-opening 2b to improve resistance and also to give better support to the Handles 4. Other embodiments include different design features used to accomplish this same goal, and some embodiments use no or additional features at all and, even without them, the bag still works for its Purposed Use as described. The Handles 4 in the preferred embodiment are made of the same mesh material as the main body. Other embodiments use different materials for the handles, such as nylon, leather or fabric. Some embodiments include one to four handles, others no handles at all, and others include different kinds of carrying means for example stripes for carrying it over the shoulder or as a backpack. The Base of the Main Body is reinforced with cotton and polyester thread seams through line 5. This reinforcement is added in the showed embodiment to ensure the resistance and ultimately the Reutilization characteristic of the bag. Other embodiments, for example those embodiments in which a continuous mesh is used do not need this kind of reinforcement. The diagonal of the Main Body 1 of the bag in its Empty Mode, used for the volume calculation is marked with line 5b. As shown in the picture, for surface and volume calculation purposes, the Main Body 1 is considered to include the Waistband 2.

Figure 2A:
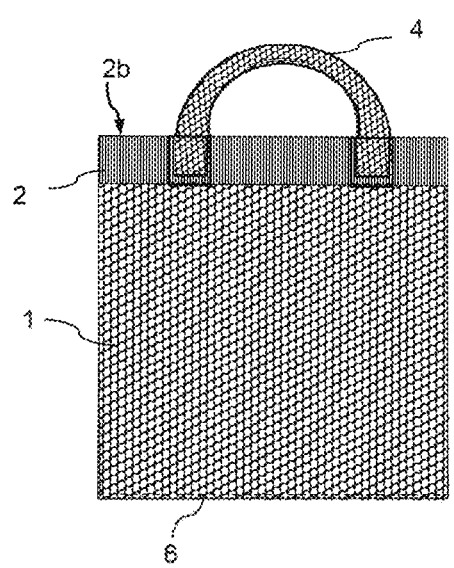
FIG. 2A is a schematic illustration of an embodiment of a Stretchable Reusable bag in accordance with the present invention in its Empty Mode.
Figure 2B:
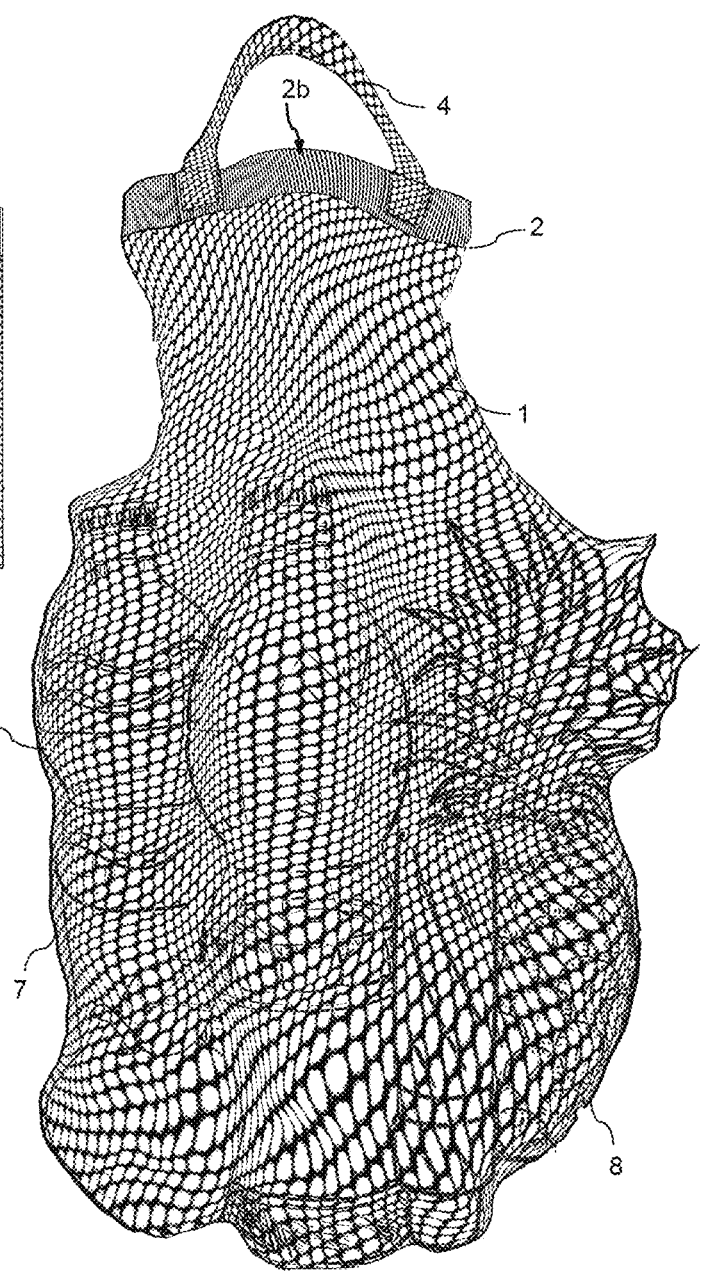
FIG. 2B is a schematic illustration of the Stretchable Reusable bag of FIG. 2A in its In-Use Mode.
Figure 2C:
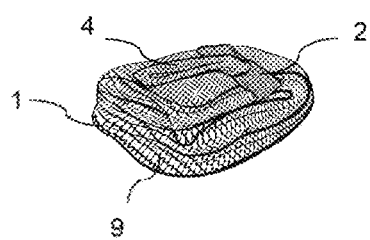
FIG. 2C is a schematic illustration of the Stretchable Reusable bag of FIGS. 2A and 2B in its Compacted Mode.

FIGS. 2A to 2C illustrate an embodiment of a Stretchable Reusable bag in accordance with the present invention. The bag comprises a Main Body 1, a Waistband 2, a bag-opening 2b and two Handles 4. In FIG. 2A the bag is showed in its Empty-Mode 6. In FIG. 2B, it is showed in its In-Use Mode 7. When Regular-Sized Items 8 are introduced into the bag through the bag-opening 2b, the bag is expanded to adapt to the shape and size of the items as shown. FIG. 2C illustrates the bag in its Compacted Mode 9. The Compacted Mode is used to reduce the size of the empty bag for the practicality of its storage and transportation. In this example, the compacted mode was achieved by folding the empty bag. Other ways of compacting the size of the empty bag include rolling it into a small tube or into a small ball, or any other ways to take advantage of the ductility of the material to easily compact it to a volume that can be as small as $1/500$ of the volume of the bag in its In-Use Mode 7. Thanks to the exceptional ductility and resistance characteristics of the materials used, transitions between bag-modes 6, 7 and 9 are Smooth Transitions as described in this specification.

FIGS. 3A to 3G show the steps for one possible method for manufacturing a Stretchable Reusable bag in accordance with the present invention. In this example, the bag is obtained through the repurposing of a Pantyhose 10. In the preferred embodiment, the Pantyhose used is "Zhongjiao Net Pants" which uses micro-mesh (or micro-fishnet) having a composition of nylon 85% and elastane (Spandex) 15%. Beileisi Fashion Pantyhose with nylon 88% and spandex 12% have also been tested and comply with the conditions of this specification. Presumably, many other brands of commercially available hosiery may also be repurposed for obtaining a Stretchable Reusable bag in accordance with the present invention through the method here described or through similar methods encompassed within the spirit and scope of the invention and that a person of ordinarily skill in the art would easily envision from the teachings of this disclosure. Bags in accordance with the present invention may be obtained by a great variety of methods, many of which do not include the use of a Pantyhose. For example, the bag may be obtained from a rectangular or tubular piece of a nylon-elastane based elastic mesh or repurposed out of other products containing this material. The reason why this specific method is preferred is because it is so easy to obtain the raw material and to manufacture the bag by following these simple steps that anyone in their own homes or in small sewing, workshop may inexpensively manufacture it.

For this illustrative method, FIG. 3A shows a Pantyhose 10 which is repurposed for obtaining a Stretchable Reusable bag in accordance with the present invention. The waistband 2 of the pantyhose will become the waistband 2 of the bag, and the Main Body 1 of the pantyhose will become the Main Body 1 of the bag. For this, the legs are separated from the Main Body 1 by cutting through the line 11a. Another cut is made to the legs through line lib at a distance of approximately ¾ of the width of the Main Body 1 therefore defining two tubular sections 12, that will be used to obtain the Handles. This embodiment shows another cut made to the lower portion of the legs through line 17 and defining two toe sections 18, from which at least one of them will be repurposed to become a Pouch 20 to be used for the storage of the bag in its Compressed Mode. FIG. 3B shows how a tubular section 12 is cut by line 13 to obtain a rectangular piece 14 as illustrated in FIG. 3C. In FIG. 3D this rectangular piece 14 is longitudinally folded in three parts through lines 15, and in FIG. 3F it is sewed trough lines 16 to obtain this way the Handles 4, that will them be attached the main Waistband 2 of the bag, as shown in FIG. 3F. The bag has four pleats 3 in its Waistband 2, and the base of the bag is reinforced with cotton and polyester thread seams through line 5. This may be achieved with the use of an overlock machine.

FIG. 3G shows how and elastic band 19 is attached to a toe section 18 to become a pouch 20 intended for the storage of the bag in its Compressed Mode. In some embodiments this pouch may be attached to the Main Body of the bag by using a stripe, sewing it into the inside or the outside of the bag, or otherwise providing means to permanently or temporarily attach the pouch to the bag, in such a way that the bag can be stored inside the pouch through a Smooth Transition and the Pouch does not get lost and is easily available to use when needed In some embodiments pouches are made of other materials and designed to adapt to different shapes and sizes of the bags in Compressed Mode. For example, a generally spherical pouch is useful to store a bag which has been transitioned into Compressed Mode by rolling it into a ball, a generally cylindrical pouch is useful to store a bag which has been transitioned into compressed Mode by rolling it into a roll, and a cuboid pouch is good for a folded bag. Pouches may also be provided to store more than one bag on them.

The description as set forth is not intended to be exhaustive or to limit the invention to the precise form disclosed. Many modifications and variations are possible in light of the teachings above without departing from the spirit and scope of the forthcoming claims.

What is claimed and desired to be secured by patent is as follows:

1. A Stretchable Reusable bag able to adopt a Compacted Mode, an Empty Mode and an In-Use Mode, said bag comprising a rectangular or square-shaped Main Body substantially made of elastane based elastic mesh, wherein, when in its Compacted Mode, said bag has a volume of at most 120 cm$^3$, wherein when in its In-Use Mode said bag is large enough to safely store and transport Regular-Sized-Items up to a total weight of 10 Kg and able of reaching a volume equivalent of that of the surface area of the Main Body of the bag in its Empty Mode times the diagonal of the Main Body of the bag in its Empty Mode times 5, wherein the Minimum Compacted Mode to Maximum In-Use Mode volume ratio is at least 1 to 500 and wherein the transitions between Bag-Modes are Smooth Transitions.

2. The Stretchable Reusable bag of Claim I wherein said nylon-elastane based elastic mesh is a micro-fish mesh.

3. The Stretchable Reusable bag of claim 2 wherein the nylon component of said nylon-elastane based elastic mesh ranges between 80% and 90% and the elastane composition of said nylon-elastane based elastic mesh is at least 5%.

4. The Stretchable Reusable bag of claim 3 wherein the composition of said nylon-elastane based elastic mesh is 85% nylon and 15% elastane.

5. The Stretchable Reusable bag of claim 1, further comprising a Waistband made of elastic material, attached to the upper part of the Main Body and one or more Handles made of the same material than the Main Body and attached to said Waistband.

6. A method to manufacture a Stretchable Reusable bag able to adopt a Compacted Mode, an Empty Mode and an In-Use Mode, said bag comprising a rectangular or square-shaped Main Body substantially made of elastane based elastic mesh, wherein, when in its Compacted Mode. said bag has a volume of at most 120 cm$^3$, wherein when in its In-Use Mode said bag is large enough to safely store and transport Regular-Sized-items up to a total weight of 10 Kg and able of reaching a volume equivalent of that of the surface area of the Main Body of the bag in its Empty Mode times the diagonal of the Main Body of the bag in its Empty Mode times 5, wherein the Minimum Compacted Mode to Maximum In-Use Mode volume ratio is at least 1 to 500, and wherein the transitions between Bag-Modes are Smooth Transitions, comprising the steps of:

STEP 1: cutting a Micro-fish net Pantyhose comprising a nylon-elastane based elastic mesh and having a waistband, a main body and a leg section, in such a way that the main body is separated from the leg section;

STEP 2: reinforcing the base of the Main Body obtained in step 1 using cotton and polyester thread seams with an overlock machine;

STEP 3: sewing four pleats to the waistband approximately at ⅓ and ⅔ of the length of said waistband respectively for the front and the back sides of the bag;

STEP 4: cutting the upper section of the legs at a distance from its upper side measuring approximately ¾ of the length of the waistband, to obtain two tubular sections;

STEP 5: longitudinally folding said tubular sections in three and longitudinally sewing it with an overlock machine to hold it together if that shape, therefore obtaining the handles;

STEP 6: sewing the handles obtained in step 5 to the front and hack sides of the waistband, starting and ending at the respective positions where the pleats have been placed in step 3.

* * * * *